Figure 1:
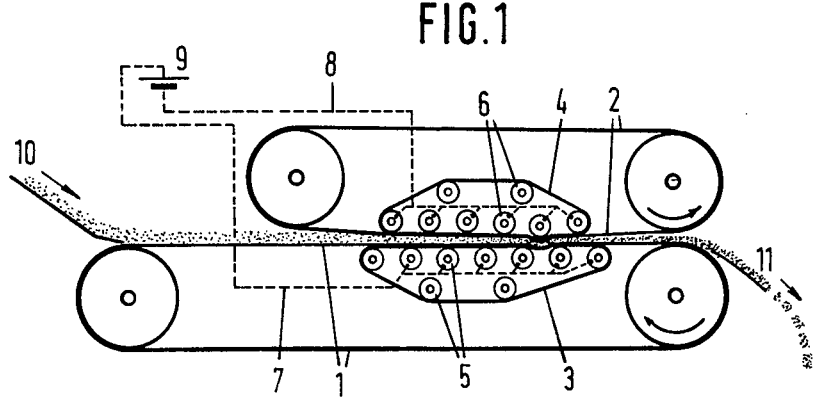

United States Patent [19]
Pepping

[11] 4,101,400
[45] Jul. 18, 1978

[54] METHOD FOR DEWATERING SLUDGE

[75] Inventor: Roelf Pepping, Sneek, Netherlands

[73] Assignee: Machinefabriek W. Hubert & Co. B.V., Sneek, Netherlands

[21] Appl. No.: 798,940

[22] Filed: May 20, 1977

Related U.S. Application Data

[63] Continuation of Ser. No. 474,092, May 28, 1974, abandoned.

[30] Foreign Application Priority Data

May 29, 1973 [GB] United Kingdom ............ 25458/73

[51] Int. Cl.² .......................................... B01D 13/02
[52] U.S. Cl. ........................ 204/180 R; 204/299 R; 204/300 R; 210/42 R; 210/59; 210/65
[58] Field of Search ............... 204/151, 180 R, 149, 204/299, 300; 210/42 R, 59, 65

[56] References Cited

U.S. PATENT DOCUMENTS

| | | | |
|---|---|---|---|
| 2,485,335 | 10/1949 | Tyson | 204/300 |
| 3,436,326 | 4/1969 | Stober | 204/300 |
| 3,543,936 | 12/1970 | Abson et al. | 204/149 |
| 3,642,605 | 2/1972 | Chenel et al. | 204/300 |

Primary Examiner—Arthur C. Prescott
Attorney, Agent, or Firm—Browdy and Neimark

[57] ABSTRACT

Sludge is dewatered to a dry content of more than 25% by a combination of
(a) pre-conditioning the sludge by flocculation with polymeric flocculants;
(b) pre-dewatering the conditioned sludge to a certain solid content corresponding with shovel consistency;
(c) thereafter dewatering the sludge further through electroendosmosis under pressure.

This combination renders it possible to produce a product having a dry content of more than about 30% irrespective of the origin of the sludge.

4 Claims, 3 Drawing Figures

U.S. Patent July 18, 1978 4,101,400

METHOD FOR DEWATERING SLUDGE

This is a continuation, of application Ser. No. 474,092, filed May 28, 1974 now abandoned.

This invention relates to a method of dewatering sludge having a dry content of less than 30% and, depending on its origin, having varying characteristics, within a zone through which the sludge to be treated is passed by means of at least one endless belt member permeable to liquid from one end of the zone, to which the sludge to be dewatered is supplied, to the other end thereof, where the dewatered sludge is delivered, and in which, for purposes of electroendosmosis, an electric direct current is passed through the sludge between electrodes in a direction transverse to the direction of transport of the sludge, while the sludge is simultaneously subjected to pressure.

Dewatering mineral, vegetable and animal materials in the form of a suspension using electro-endosmosis is, in general, known from German patent specification No. 163,549, in which the sludge to be dewatered is treated in the condition in which it is available. Thus, thin liquid sludge materials could be dewatered by the prior method, construing the apparatus in which the treatment is carried out as being composed of a series of tanks advanced by means of an endless belt, said tanks having an electrically conductive, liquid-permeable bottom serving as one electrode, in which tanks the thin liquid sludge to be dewatered is introduced, whereafter the surface of the sludge is contacted with the other electrode, which can exercise a certain pressure on the sludge in the tanks. There is no disclosure in the German specification as to the dry contents to be achieved by this method.

In the purification of waste water, a sludge is formed, the processing of which is becoming more and more important. Formerly, sludge was dried in drying beds or lagoons; at present there is a growing tendency for sludge to be processed mechanically, in particular in view of the huge scale at which waste water purification is nowadays being required to be carried out.

Some of the most important sludge dewatering machines are centrifuges, screen belt presses, vacuum filter belts, rotary drum vacuum filters, and filter presses, which are available in various forms. When these machines are used, a pre-treatment or conditioning of the sludge to be dewatered is generally necessary. By conditioning is understood the addition of chemical flocculants, for example, lime iron salts and aluminum salts, and inert materials, or a heat treatment of the sludge. Organic flocculants are also known at the present time, namely, the so-called polymeric flocculants or polyelectrolytes.

Depending on the kind of sludge, the addition of polyelectrolytes enables the sludge to be dewatered by means of presses, for example, screen belt presses or vacuum filter belts, to a dry content of about 15% to about 25%. It should be noted in this connection that, generally speaking, primary sludge can be dewatered to a greater extent than activated sludge, namely, to a dry content of about 25% and about 15%, respectively.

Experiments have shown that in the dewatering of sludge conditioned with polyelectrolytes an increase in pressure on the conditioned sludge, for example, the pressure in a screen belt press, or the use of a higher vacuum in a vacuum filter belt, or longer processing periods can hardly increase the above percentages of solids.

Thus, for example, generally speaking, biologically formed sludge from an activated sludge purification process, cannot be dewatered to a solids content of about 30% in a technologically and economically feasible way by any known means.

Whatever the ultimate destination of the sludge, for example, controlled dumping, thermal drying, combustion, one will always wish as high a dry content as possible, because, as will be clear, the presence of water adversely affects the cost of transport, cost of drying, and the combustibility of the sludge.

If sludge contains 30% solids consisting of about 70% of organic material, it can be incinerated in a self-sustaining manner.

If it is intended for the sludge to be dumped, with or without solid waste, such as municipal refuse and the like, it is also desirable that the dry solids content of the sludge is as high as possible, preferably higher than 30%.

It is an object of the present invention to provide a method and apparatus for economically dewatering sludge of various origins to a dry solids content sufficiently in excess of 25%, preferably in excess of 30%.

According to one aspect of the present invention, there is proposed a method of dewatering sludge having a dry content of less than 30% and, depending on its origin, having varying characteristics, within a zone through which sludge to be treated is passed by means of at least one endless belt member permeable to liquid from one end of the zone, to which the sludge to be dewatered is supplied, to the other end thereof, where the dewatered sludge is delivered, and in which for purposes of electro-endosmosis, an electric direct current is passed through the sludge between electrodes in a direction transverse to the direction of movement of the sludge, while the sludge is simultaneously subjected to pressure, characterized in that a sludge conditioned with the use of a polymeric flocculant is supplied to said zone and transported further by means of said endless liquid-permeable belt member, the conditioned sludge being first de-watered to shovel consistency with or without the use of subatmospheric and/or superatmospheric pressure, subsequently dewatered further by passing it in a layer for no more than $3\frac{1}{2}$ minutes between said electrodes for electro-endosmosis, applying a voltage differential across the layer of sludge by passing said direct current through the layer of sludge.

It is only owing to the combination of the pre-conditioning of the sludge by flocculating with polymeric flocculants, e.g., polyelectrolytes, the pre-dewatering of the conditioned sludge to a certain dry content corresponding with shovel consistency and — only then — electro-endosmotic dewatering under pressure, that, irrespective of the origin of the sludge, products can be obtained having dry contents of more than about 30%.

By "shovel consistency" is understood approximately a condition of the sludge in which it can be shoveled. However, the sludge cake still has a certain plasticity; under the influence of vibration or when dumped on a heap, the sludge flows away. Depending on the kind of sludge and the pre-treatment, this condition occurs at a dry content of about 18 to 25%.

It has further been found that the physico-chemical condition of the sludge after the electro-endosmotic treatment thereof is maintained for a sufficiently long period of time to cause the sludge to release an additional quantity of water when the pressure is further increased. Preferably, therefore, after the electro-endosmotic treatment and/or after each previous electro-endosmotic treatment, the layer of the sludge is subjected to an increased pressure.

In the method according to the invention, the pre-dewatering can be conducted with or without the use of superatmospheric and/or subatmospheric pressure.

In the method according to the invention, the electro-endosmotic treatment is contemplated to last no more than 3½ minutes as otherwise the sludge dewatering plant would be of intolerably large size.

With a view to safety, and furthermore in connection with corrosion occurring at the positive electrode, the electrical voltage differential across the sludge layer should be no higher than 250 V.

The pressures to be exercised on the sludge will not be unduly high, in order to prevent undue loads on the mechanical parts of the machine. Pressures of, for example, 0.4 – 0.5 kg/cm$^2$ to some atmospheres, for example 1 – 2 kg/cm$^2$, are effective.

The invention also relates to apparatus suitable for use in the method according to the invention and characterized by at least one endless screen belt, which may or may not be electrically conductive, means for subjecting sludge to be transported on said screen belt to pressure, and means for passing an electric current through the sludge.

The invention will be described in more detail with reference to the accompanying drawings, in which FIGS. 1, 2 and 3 respectively show three embodiments, by way of example, in diagrammatic, part-sectional side elevation.

FIG. 1 shows a pair of endless belts 1, 2 which are poor electrical conductors or non-conductors. Belt 1 is the lower belt and acts as a screen belt, and belt 2 is the upper belt and acts as a pressure belt, which is likewise water-permeable. Arranged within the confines of belts 1 and 2 are endless belts 3 and 4, respectively, which serve as flexible electrodes. Belts 3 and 4 are passed over metal support rollers 5 and 6, respectively, which via wires 7 and 8, respectively, are connected to a source of voltage 9. Sludge conditioned with polymeric flocculants, for example, a polyelectrolyte, is supplied at 10 and is dewatered under the influence of gravity in the first section of the part of movement provided by belt 1, and subsequently is additionally dewatered under mechanical pressure in the section defined between belts 3 and 4, in which the sludge is simultaneously subjected to electrical current whereafter the dewatered sludge is discharged at 11.

Figure 2:
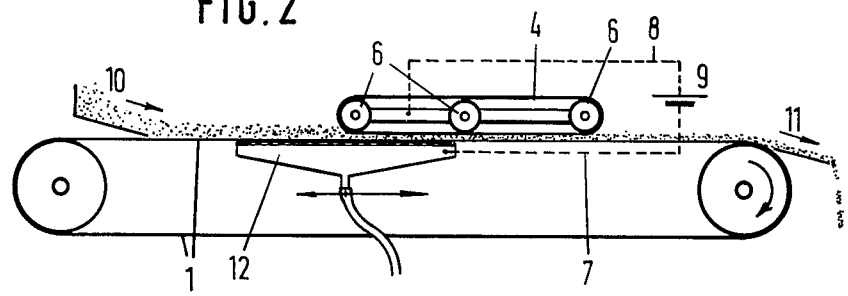

The embodiment illustrated in FIG. 2 is a vacuum filter belt. Parts corresponding to the showing of FIG. 1 are designated by the same reference numerals in FIG. 2. A lower electrode is provided by a vacuum box 12, which moves along with belt 1 and can be periodically rapidly returned to a starting position.

Current can alternatively be supplied through a web or band resting on the sludge.

Figure 3:
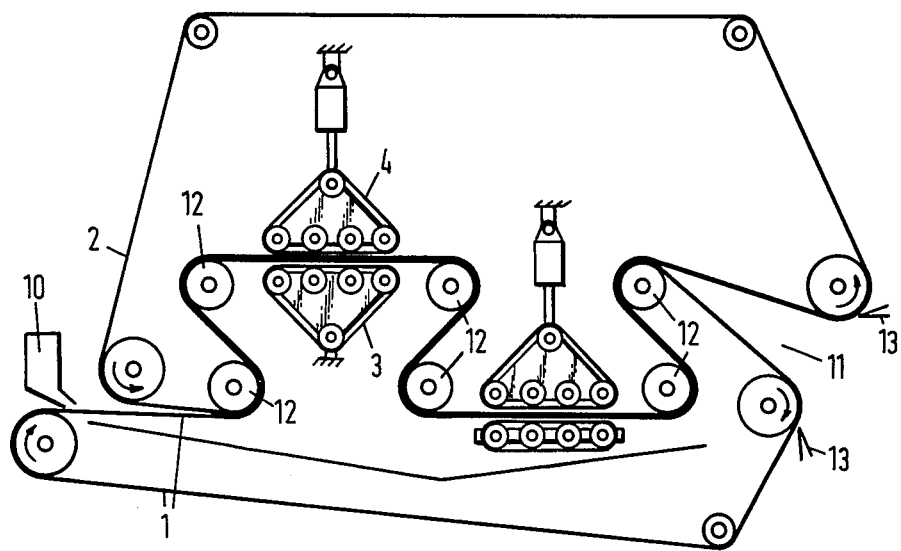

FIG. 3 illustrates a preferred embodiment of apparatus according to the invention, formed as a screen belt press with supply means 10 for supplying conditioned sludge to endless belts 1 and 2 formed as screen belts, a plurality of pairs of electrodes (only two of which are shown), formed by endless belts 3 and 4, connected in a manner not shown to the poles of a source of voltage. Downstream of each electro-endosmosis section defined by the electrode arrangements 3 and 4 means are provided by which the sludge can be subjected to increased pressure in the form of pairs of rollers 12, about which belts 1 and 2 are passed in the form of an S. Such a pair of rollers is also arranged upstream of the first electro-endosmosis section, which is the final part of the pre-dewatering section, which begins approximately at the outlet of 10.

Means 13 are provided for removing the sludge cake from the belts. Such means, for example, scraper blades, are well known in the art and may be of any suitable construction, and will accordingly not be described further. Thereafter the belts are optionally cleaned and returned. The dewatered sludge is discharged at 11.

As regards the progress of the dewatering treatment as the sludge is transported through the apparatus according to the invention, reference is made to the embodiment of FIG. 1, in which for example, the sludge would have a dry content of about 2% at 10, about 6–7% at the point where the upper belt is conducted into contact with the upper surface of the sludge layer, about 16–20% at the beginning of the space between the electrodes, and more than 30% after completion of the dewatering treatment.

I claim:

1. In a method of dewatering sludge having a dry content of less than 30% comprising continuously passing the sludge, on an endless belt member permeable to liquid, between electro-endosmosis electrodes and applying an electrical direct current through the sludge between the electrodes in a direction transverse to the direction of movement of the sludge, the improvement comprising:

preconditioning the sludge by flocculation with polymeric flocculants;

while the sludge is on the endless belt member and before the sludge is passed between the electro-endosmosis electrodes, pre-dewatering the sludge to shovel consistency; and while the sludge is on the endless belt member, subjecting the sludge to mechanical pressure at least at locations during and after the passage of the sludge between the electro-endosmosis electrodes to a sufficient extent at each location to provide an amount of dewatering greater than the amount achieved when the dewatering is accomplished with pressure applied only during passage of the sludge between the electrodes.

2. A method in accordance with claim 1 wherein said step of subjecting the electrodes to mechanical pressure further includes the application of pressure at a location before passage of the sludge between the electrodes.

3. A method in accordance with claim 1, wherein the sludge is passed between a plurality of pairs of electro-endosmosis electrodes, electrical direct current being applied through the sludge between each of said pairs in a direction transverse to the direction of movement of the sludge, and wherein said pre-dewatering step is before the sludge is passed between the first pair of said electrodes, and said step of subjecting the sludge to mechanical pressure includes applying mechanical pressure, during and after passage between each of the pairs of electrodes.

4. A method in accordance with claim 3, wherein said step of subjecting the electrodes to mechanical pressure further includes the application of pressure at a location before passage of the sludge between the first pair of said electrodes.

* * * * *